(12) United States Patent
Goto et al.

(10) Patent No.: US 8,519,701 B2
(45) Date of Patent: Aug. 27, 2013

(54) MAGNETIC RESOLVER

(75) Inventors: Kazuhiro Goto, Toyota (JP); Eiji Yamada, Owariasahi (JP); Toshihiro Kimura, Obu (JP); Yuji Sekitomi, Obu (JP); Yuki Yamakawa, Miyoshi (JP); Mutsumi Matsuura, Fukuroi (JP); Takashi Sano, Fukuroi (JP); Hiroshi Abe, Kakegawa (JP)

(73) Assignees: Toyota Jidosha Kabushiki Kaisha, Toyota-shi (JP); Matsuo Industries, Inc., Obu (JP)

( * ) Notice: Subject to any disclaimer, the term of this patent is extended or adjusted under 35 U.S.C. 154(b) by 498 days.

(21) Appl. No.: 12/878,098

(22) Filed: Sep. 9, 2010

(65) Prior Publication Data
US 2011/0057648 A1    Mar. 10, 2011

(30) Foreign Application Priority Data
Sep. 9, 2009   (JP) .................................. 2009-208416

(51) Int. Cl.
*G01B 7/30* (2006.01)
*G01D 5/14* (2006.01)

(52) U.S. Cl.
CPC ..................................... *G01D 5/145* (2013.01)
USPC .................................................. 324/207.25

(58) Field of Classification Search
None
See application file for complete search history.

(56) References Cited

U.S. PATENT DOCUMENTS 4,013,911 A * 3/1977 Fujiwara et al. .......... 340/870.35
5,160,886 A * 11/1992 Carlen ...................... 324/207.16

FOREIGN PATENT DOCUMENTS

| JP | 2001349749 A | * | 12/2001 |
| JP | 2005207748 A |   | 8/2005  |
| JP | 2007171131 A |   | 7/2007  |
| JP | 2007192640 A |   | 8/2007  |
| JP | 2007285774 A |   | 11/2007 |

\* cited by examiner

*Primary Examiner* — Paresh Patel
(74) *Attorney, Agent, or Firm* — Gifford, Krass, Sprinkle, Anderson & Citkowski, P.C.

(57) ABSTRACT

A magnetic resolver includes a stator core made of magnetic material, coils, and a rotor. The stator core has a base plate and protrusions formed integrally with the base plate so as to protrude from a surface of the base plate in the thickness direction. The coils are provided around the respective protrusions. The rotor is disposed so as to face the surface of the base plate with the coils interposed therebetween. The overlapping area between the rotor and each of the protrusions changes with a change in a rotation angle of the rotor relative to the stator core. The stator core has through-holes that pass through the base plate and the respective protrusions in the thickness direction.

4 Claims, 5 Drawing Sheets

MAGNETIC RESOLVER

INCORPORATION BY REFERENCE

The disclosure of Japanese Patent Application No. 2009-208416 filed on Sep. 9, 2009 including the specification, drawings and abstract is incorporated herein by reference in its entirety.

BACKGROUND OF THE INVENTION

1. Field of the Invention

The invention relates generally to a magnetic resolver, and more specifically, to a magnetic resolver that detects the rotational position of a rotating body.

2. Description of the Related Art

Related arts pertaining to a magnetic resolver that detects the rotational position of a rotating body using magnetic induction are described in, for example, Japanese Patent Application Publication No. 2007-171131 (JP-A-2007-171131), Japanese Patent Application Publication No. 2007-285774 (JP-A-2007-285774), and Japanese Patent Application Publication No. 2005-207748 (JP-A-2005-207748).

Figure 9:
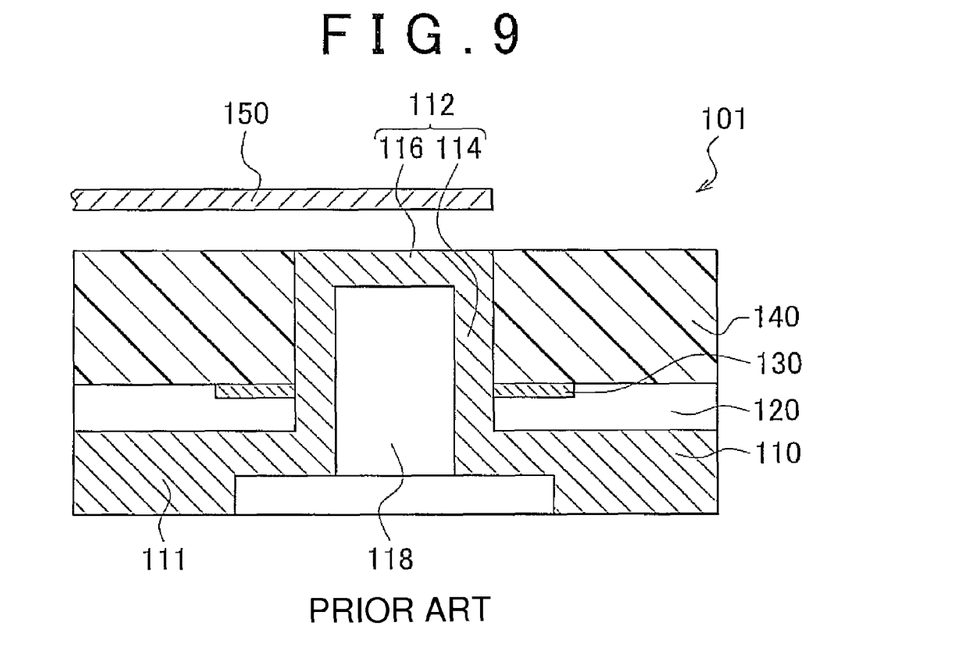
FIG. 9 is a cross-sectional view schematically showing the configuration of an existing magnetic resolver.

FIG. 9 is a cross-sectional view schematically showing the configuration of an existing magnetic resolver 101. As shown in FIG. 9, the magnetic resolver 101 includes a stator core 110, a substrate 120 on which a coil 130 is formed, and a rotor 150 that is provided so as to face the stator core 110 with the coil 130 interposed between the rotor 150 and the stator core 110. A surface of the coil 130, which faces the rotor 150, is covered with and protected by a resin cover 140.

The stator core 110 has a base plate 111 and a protrusion 112. The base plate 111 is made of iron-based magnetic material and has a ring shape. The protrusion 112 is formed integrally with the base plate 111 by machine-processing such as press working. The protrusion 112 has a side wall 114 and a ceiling 116. The side wall 114 extends upward from the base plate 111. The ceiling 116 closes an end portion of the side wall 114, which faces the rotor 150. Formed inside the protrusion 112 is a space 118 defined by the side wall 114 and the ceiling 116.

Figure 10:
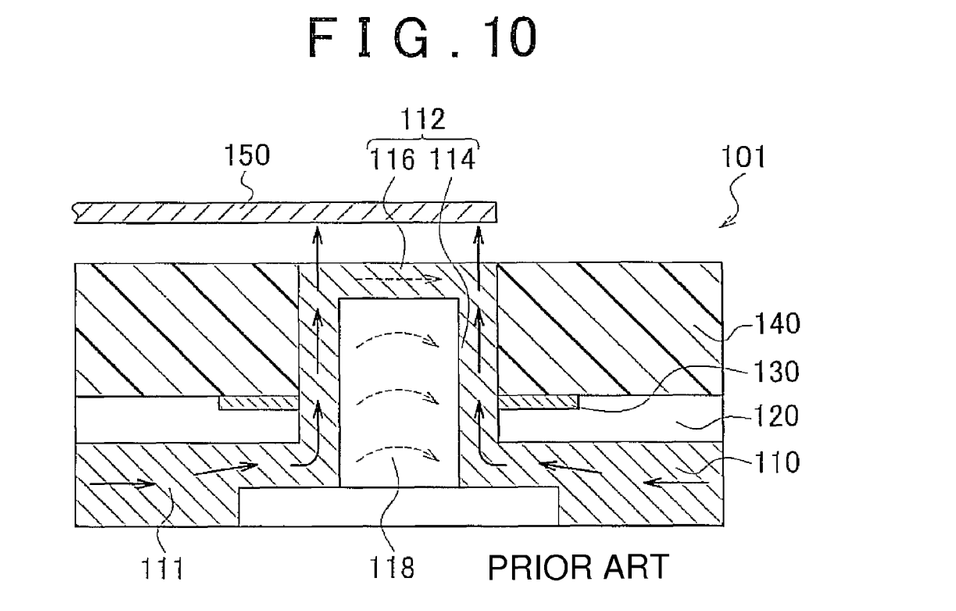
FIG. 10 is a view schematically showing flows of magnetic flux in the existing magnetic resolver.

FIG. 10 is a view schematically showing flows of magnetic flux in the existing magnetic resolver 101. As shown by solid-line arrows in FIG. 10, magnetic flux generated by the coil 130 passes through the inside of the stator core 110 and is output to the rotor 150. However, as shown by broken-line arrows in FIG. 10, a portion of the magnetic flux generated by the coil 130 travels through the inside of the ceiling 116 and the space 118 but does not come out of the stator core 110. Thus, such magnetic flux is not output from the protrusion 120 of the stator core 110 toward the rotor 150.

When such magnetic flux (leakage flux) that is not output to the rotor 150 increases, the output voltage decreases, and therefore, the ratio of the output voltage to the input voltage (transformer ratio) decreases. As a result, the detection resolution of the magnetic resolver 101 deteriorates, and the rotation angle of the rotating body is not accurately detected.

SUMMARY OF THE INVENTION

The invention provides a magnetic resolver that achieves a high transformer ratio.

An aspect of the invention relates to a magnetic resolver that includes a stator core that is made of magnetic material, a plurality of coils, and a rotor. The stator core has a base plate and a plurality of protrusions. The protrusions are formed integrally with the base plate so as to protrude from a surface of the base plate in the thickness direction of the base plate. The coils are provided around the respective protrusions. The rotor is disposed so as to face the surface of the base plate with the coils interposed between the rotor and the surface of the base plate. The overlapping area between the rotor and each of the protrusions changes with a change in the rotation angle of the rotor relative to the stator core. The stator core has a plurality of through-holes that pass through the base plate and the respective protrusions in the thickness direction.

In the magnetic resolver according to the aspect described above, a base portion of each of the protrusions may have an extension portion of which the outer peripheral face has a curved shape in a longitudinal cross section of the protrusion. The outer diameter of the extension portion may increase toward the base plate.

With the magnetic resolver according to the aspect described above, it is possible to improve the transformer ratio, thereby increasing the rotation angle detection resolution of the magnetic resolver.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Embodiments of the invention will be described below with reference to the accompanying drawings. Note that, in the drawings mentioned below, the same or corresponding portions are denoted by the same reference numerals, and the detailed descriptions thereof will be provided only once.

Also, in the embodiments described below, each structural element is not essential to the invention, unless otherwise specified. In addition, the number of elements, the volume, and the like mentioned in the following description of the embodiments are merely examples unless otherwise specified, and the scope of the invention is not limited by the number of elements, the volume and the like.

Figure 1:
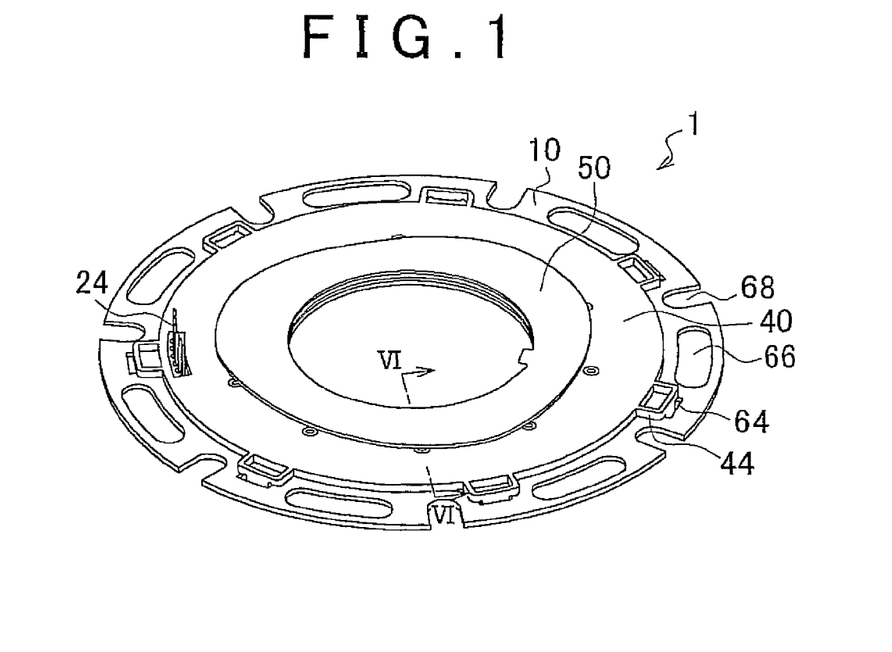
FIG. 1 is a perspective view showing the configuration of a magnetic resolver according to a first embodiment of the invention.

FIG. 1 is a perspective view showing the configuration of a magnetic resolver 1 according to a first embodiment of the invention. The magnetic resolver 1 of the first embodiment includes a stator core 10, a substrate 20 (not shown in FIG. 1) on which a coil 30 is formed, a resin cover 40 that covers the substrate 20, and a rotor 50. The stator core 10, the substrate 20, the resin cover 40, and the rotor 50 each have a thin-plate shape to realize a thinner magnetic resolver 1, and are stacked in this order.

Figure 2:
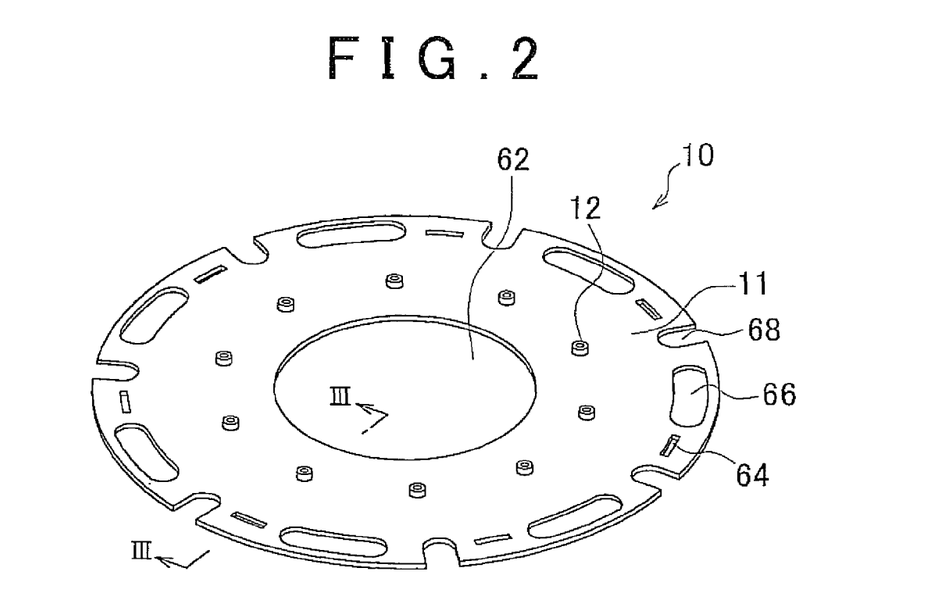
FIG. 2 is a perspective view showing the configuration of a stator core.

FIG. 2 is a perspective view showing the configuration of the stator core 10. The stator core 10 has a base plate 11 having a ring shape and a plurality of protrusions 12 that protrude from the base plate 11. At the center of the base plate 11, a rotary shaft-insertion hole 62 having a circular shape is formed so as to pass through the base plate 11 in the thickness direction. A rotary shaft is inserted into the rotary shaft-insertion hole 62. A rotating body, of which the rotational position is to be detected by the magnetic resolver 1, is fixed to the rotary shaft so as to be rotatable together with the rotary shaft. Engagement holes 64, in which the resin cover 40 is engaged, are formed in a perimeter portion of the base plate 11. As shown in FIG. 1, engagement portions 44 formed on the outer periphery of the resin cover 40 are engaged in the engagement holes 64, whereby the resin cover 40 is secured to the stator core 10.

Fitting holes 66 and adjustment holes 68 are also formed in the perimeter portion of the base plate 11. The fitting holes 66 are used to fix the magnetic resolver 1 to a fixed portion such as a casing that accommodates the rotating body. The adjustment holes 68 are used to make zero-adjustment to correct mechanical errors that may occur when the magnetic resolver 1 is fitted to the fixed portion. Bolts are inserted into the corresponding fitting holes 66 to temporarily fit the magnetic resolver 1 to the fixed portion. Then, adjustment bars are inserted into the adjustment holes 68, and the magnetic resolver 1 is moved in the circumferential direction to make the zero-adjustment. Then, the bolts are securely fastened so that the magnetic resolver 1 is fixed to the fixed portion. Each of the fitting holes 66 is formed as a long hole that extends in the circumferential direction of the base plate 11 so that the magnetic resolver 1 is allowed to move in the circumferential direction.

Figure 3:
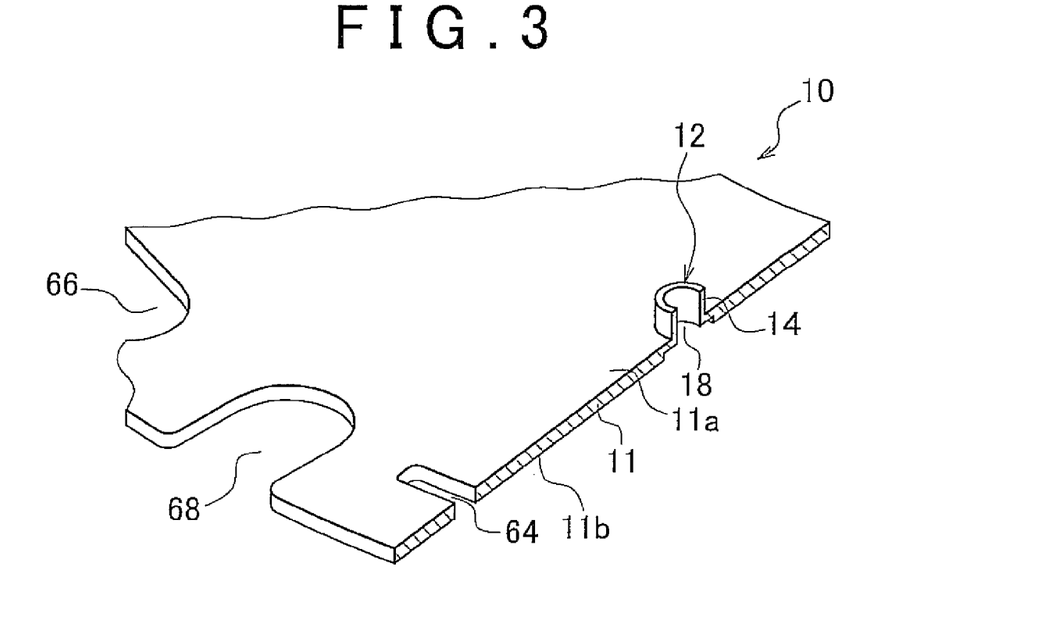
FIG. 3 is a cross-sectional view of the stator core taken along the line shown in FIG. 2.

FIG. 3 is a cross-sectional view of the stator core 10 taken along the line shown in FIG. 2. As shown in FIG. 3, each of the protrusions 12 protrudes from a surface 11a of the base plate 11 in the thickness direction of the base plate 11. The stator core 10 is made of iron-based magnetic material such as ferrosilicon. The protrusions 12 are formed by subjecting part of the base plate 11 to machine processing such as press working, and are formed integrally with the base plate 11. That is, both the base plate 11 and the protrusions 12 are made of magnetic material. Integrally forming the protrusions 12 with the base plate 11 by machine-processing reduces the manufacturing cost of the stator core 10.

A plurality of the protrusions 12 is formed on the surface 11a of the base plate 11, and all the protrusions 12 are in the same shape. Each of the protrusions 12 is a columnar protrusion having a radius r, in the first embodiment. The protrusions 12 are regularly arranged along the circumferential direction of the ring-shaped base plate 11. That is, the centers of the protrusions 12 (the centers of circles having the radius r) are set at regularly-spaced angular positions on the circumference of a circle that is concentric with the ring-shaped base plate 11. In FIG. 2, ten protrusions 12 (ten poles) are formed at intervals of 36°.

Figure 6:
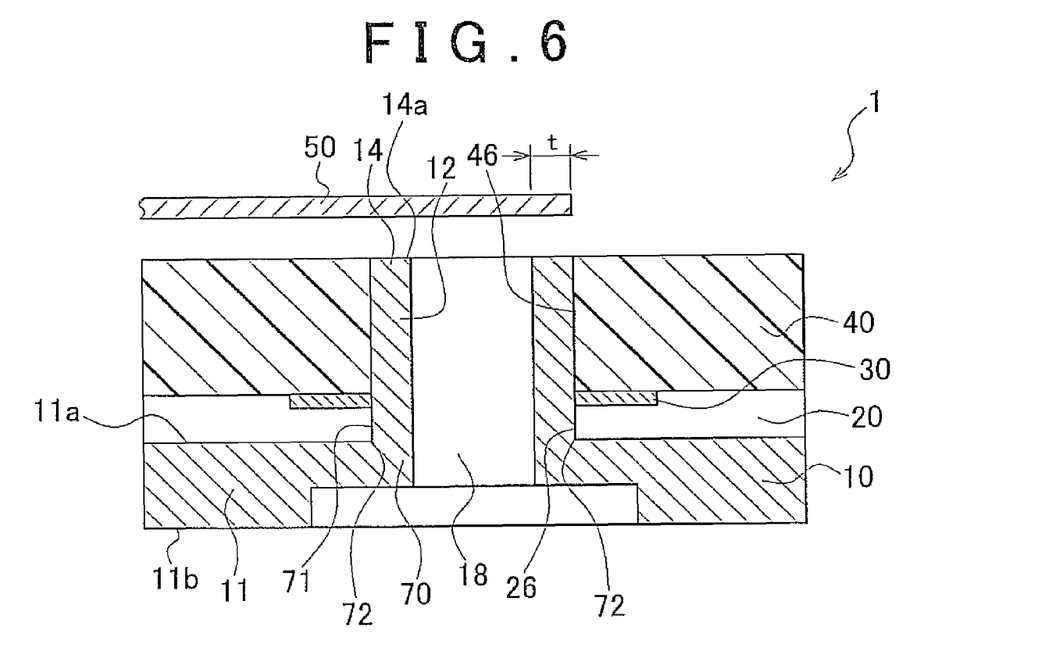
FIG. 6 is a cross-sectional view of the magnetic resolver taken along the line VI-VI shown in FIG. 1.

The stator core 10 has through-holes 18 that pass through the base plate 11 and the protrusions 12 in the thickness direction of the stator core 10. Each through-hole 18 is a space inside the protrusion 12, which is defined by a side wall 14. Due to the presence of the through-hole 18, the protrusion 12 is formed as a hollow member. The protrusion 12 does not have the ceiling 116 shown in FIG. 9. Unlike the space 118 shown in FIG. 9, the through-hole 18 extends from an end of the protrusion 12, which is on the surface 11a-side, to a back surface 11b of the base plate 11. The through-hole 18 passes through the stator core 10 in the thickness direction so that the space above the surface 11a and the space below the back surface 11b in FIG. 6 are communicated with each other.

Figure 4:
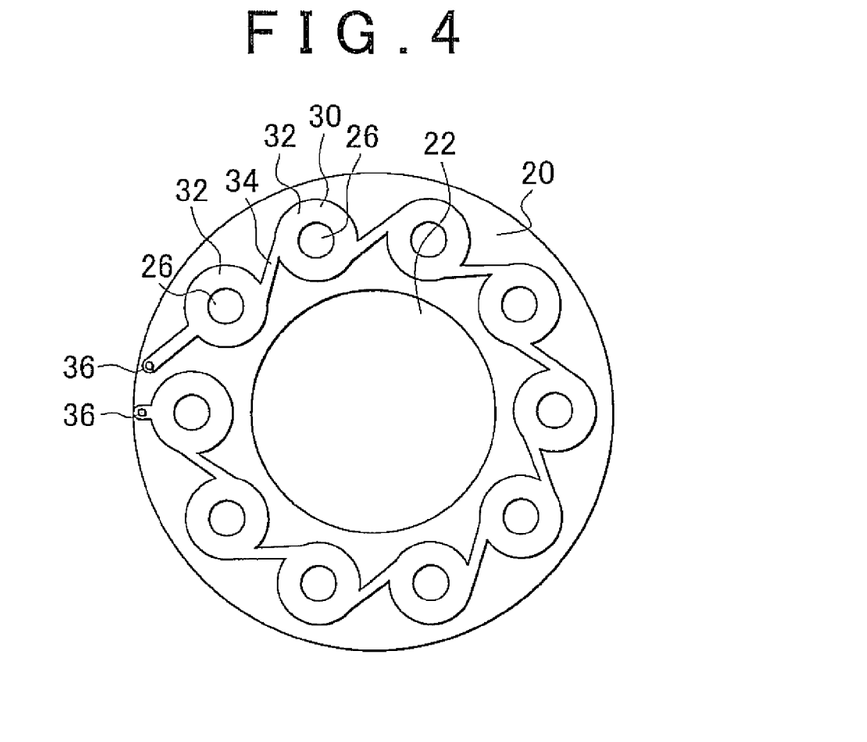
FIG. 4 is a plan view of a substrate.

FIG. 4 is a plan view of the substrate 20. The substrate 20 has a ring shape as shown in FIG. 4, and is made of insulating material. A rotary shaft-insertion hole 22, into which the rotary shaft is inserted, is formed at the center of the substrate 20. A plurality of through-holes 26 that pass through the substrate 20 in the thickness direction is formed in the substrate 20. Each of the through-holes 26 has a circular shape that corresponds to a planar shape of the protrusion 12. Specifically, each of the through-holes 26 has a shape of a circle of which the radius is equal to or slightly larger than the radius r of the protrusion 12.

The through-holes 26 are regularly arranged along the circumferential direction of the ring-shaped substrate 20. That is, the centers of the through-holes 26 (the centers of circles) are set at regularly-spaced angular positions on the circumference of a circle that is concentric with the ring-shaped substrate 20. In an example shown in FIG. 4, ten through-holes 26 (ten poles) are formed at intervals of 36° so as to correspond to the protrusions 12.

Coils 30 are formed on a surface of the substrate 20. The coils 30 have coil pattern portions 32 and connection lines 34. Each coil pattern portion 32 is arranged around the corresponding through-hole 26 and has a spiral shape. The connection lines 34 connect consecutive coil pattern portions 32 in series. The coil pattern portions 32 and the connection lines 34 are formed by printing conductive material such as copper on the surface of the substrate 20. When the substrate 20 is placed on the stator core 10, the protrusions 12 pass through the through-holes 26 of the substrate 20. Thus, one coil portion that serves as one pole is formed around each through-hole 26 by one coil pattern portion 32 and one protrusion 12.

The coils 30 are preferably formed of coils that are prepared separately for respective phases (1-phase input and 2-phase output, for example). Preferably, the coils 30 include coils functioning as excitation phase coils (excitation coils), coils functioning as cosine-phase output coils (cosine-phase coils), and coils functioning as sine-phase output coil (sine-phase coil). The cosine-phase coil and the sine-phase coil are offset from each other by an electric angle of 90°.

The numbers of windings and the winding directions of the coil pattern portions 32 of the respective phase coils formed on the substrate 20 are determined in such a manner that a desired sine-phase output and a desired cosine-phase output are induced as the rotor 50 rotates (as the overlapping area between the stator core 10 and the rotor 50 changes with the rotation of the rotor 50), as described later. When an alternative current is passed through the excitation coil, the cosine-phase coil and the sine-phase coil produce outputs in accordance with the position of the rotor 50. Based on the difference between the outputs from the sine-phase coil and the cosine-phase coil, the position of the rotor 50 is detected.

The excitation coils, the cosine-phase coils, and the sine-phase coils may be formed on separate substrates 20. The substrates 20 for respective phase coils are prepared. The coil pattern portions 32 in the same phase are printed on one substrate 20. Then, the substrates 20 are stacked to form the coils 30. This makes it possible to change the configuration (adjust or change the number of windings and the winding direction) of the coil pattern portions 32 in one phase without changing the configurations of the coil pattern portions 32 in the other phases, resulting in enhancement of the versatility. Also, it is possible to flexibly increase the number of phases or change the phases.

Connector-connecting portions 36 that provide electric connection between coils 30 and a connection terminal 24 (see FIG. 1) are formed at end portions of connection lines 34 of some coils 30. When the resin cover 40 shown in FIG. 1 is placed on the substrate 20, the connection terminal 24 is fitted into the connector-connecting portions 36. The connection terminal 24 and the connector-connecting portions 36 are electrically connected to each other by appropriate means, for example, welding, soldering, or press-fitting. Thus, electric connection is provided between the connection terminal 24 and the coils 30 in respective phases.

Figure 5:
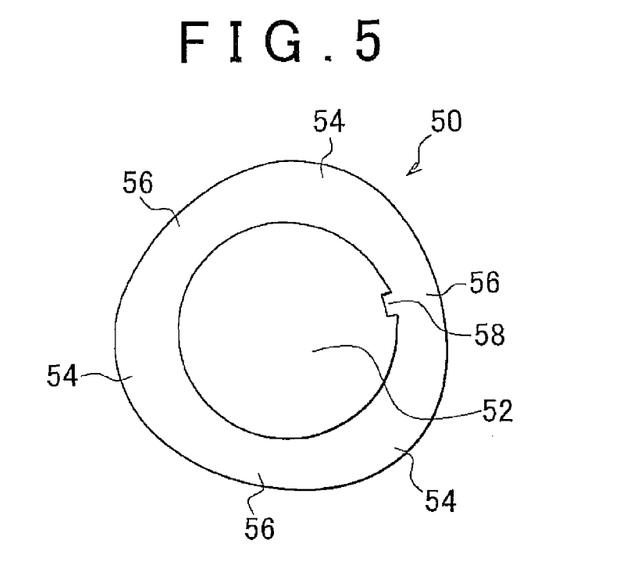
FIG. 5 is a plan view of a rotor.

FIG. 5 is a plan view of the rotor 50. As shown in FIG. 5, a rotary shaft-insertion hole 52 into which the rotary shaft is inserted is formed at the center of the rotor 50. A part of the inner periphery of the rotor 50, which defines the rotary shaft-insertion hole 52, projects radially inward to form a key portion 58. The key portion 58 engages with a key groove formed in the outer peripheral face of the rotary shaft, whereby the rotor 50 is fixed to the rotary shaft so that the rotor 50 and the rotary shaft rotate together with each other.

The rotor 50 has three lobe portions 54 and three flat portions 56 that are formed between the consecutive lobe portions 54. The outer periphery of the lobe portions 54 bulge further radially outward than that of the flat portions 56, whereas the outer periphery of the flat portions 56 are positioned further radially inward than that of the lobe portions 54. The rotor 50 is formed in such a manner that the distance from the center of the rotor 50 (i.e., the center of the rotary shaft-insertion hole 52 having a substantially circular shape) to the outer periphery is larger at the lobe portions 54 than at the flat portions 56. The outer periphery of the rotor 50 is rotationally symmetric with respect to the center of the rotor 50.

The shape of the rotor 50 is not limited to the shape shown in FIG. 5. The rotor 50 may be formed in any shape as long as the magnetic properties can be changed during the rotation of the rotor 50. For example, the planar shape of the rotor 50 may be oval.

FIG. 6 is a cross-sectional view of the magnetic resolver 1 taken along the line VI-VI shown in FIG. 1. As shown in FIG. 6, the substrate 20 and the resin cover 40 are stacked in this order on the base plate 11 of the stator core 10. The substrate 20 and the resin cover 40 are arranged in such a manner that the protrusions 12 of the stator cores 10 are aligned with the through-holes 26 formed in the substrate 20 and the through-holes 46 formed in the resin cover 40. With this arrangement, the protrusions 12 pass through the through-holes 26 and the through-holes 46 in this order. The engagement portions 44 of the resin cover 40 engage in the engagement holes 64 of the stator core 10 so that the substrate 20 is held between the base plate 11 and the resin cover 40. Thus, the stator core 10, the substrate 20, and the resin cover 40 are fitted together to form an assembly.

In this assembly, the coil portion of each pole is formed by the protrusion 12 and the coil 30 formed around the protrusion 12 and on the substrate 20. The side wall 14 of each protrusion 12 passes through the through-hole 26 of the substrate 20 and the through-hole 46 of the resin cover 40 so that the end portion 14a of the side wall 14 is exposed on the surface of the resin cover 40. The end portion 14a of each protrusion 12 may be substantially flush with the surface of the resin cover 40.

The rotor 50 is disposed so as to face the surface 11a of the base plate 11 of the stator core 10 with the resin cover 40 and the substrate 20, on which the coils 30 are formed, interposed therebetween. The rotor 50 is fixed to the rotary shaft that constitutes the rotational center of the rotating body of which the rotational position is to be detected, in such a manner that the rotor 50 and the rotating body rotate together with each other. As the rotary shaft rotates, the rotor 50 rotates relative to the stator core 10 that is fixed to the fixed portion.

A plurality of the lobe portions 54 and a plurality of the flat portions 56 are formed in the outer periphery of the rotor 50. As described above, the radius of the rotor 50 is larger at the lobe portion 54 than at the flat portion 56. Therefore, the overlapping area between the rotor 50 and each protrusion 12, namely, the area of a portion of each protrusion 12, which is covered by the rotor 50, changes with a change in the rotation angle of the rotor 50 relative to the stator core 10, which is caused when the rotor 50 rotates relative to the stator core 10.

As the overlapping area changes, the area in which the magnetic flux passing through the protrusion 12 is blocked also changes. Accordingly, the magnetic flux resistance changes, and the current induced by the coil 30 (i.e., the cosine-phase coil or the sine-phase coil described above) around the protrusion 12 (output voltage) also changes. The overlapping area changes with a change in the outer diameter of the rotor 50, which is caused by the rotation of the rotor 50 about the rotary shaft. With the magnetic resolver 1 according to the first embodiment, it is possible to detect the rotation angle of the rotor 50 by using a change in the magnetic flux resistance, which is caused by the rotation of the rotor 50. That is, it is possible to detect the rotation angle of the rotary shaft, and thus, the rotation angle of the rotating body of which the rotation angle is to be detected.

According to the first embodiment, each of the protrusions 12 does not have the ceiling 116 shown in FIG. 9. Each of the through-holes 18 is formed so as to pass through the stator core 10 in the thickness direction. The protrusion 12 has the sleeve-shaped side wall 14 that is formed by protruding a portion of the base plate 11. The through-hole 18 that passes through the stator core 10 in the thickness direction is formed on the inner side of the side wall 14. The through-hole 18 has a shape obtained by burring (burring shape).

Since the protrusion 12 has a hollow burring shape, the magnetic resistance in the space inside the protrusion 12 is large. Therefore, the magnetic flux that has reached the end portion 14a of the side wall 14 of the protrusion 12 easily flows toward a magnetic body close to the end portion 14a, that is, toward the rotor 50. Because the magnetic flux is directed toward the rotor 50, the magnetic flux passing through the space inside the protrusion 12 is reduced. Thus, the magnetic flux output from the protrusion 12 to the rotor 50 increases, and the leakage magnetic flux decreases. As a result, a decrease in the ratio of the output voltage to the input voltage is restricted, which increases the transformer ratio.

It is known that, when the magnetic resolver 1 is used at high electric frequencies, a phenomenon called a skin effect occurs because the density of reaction magnetic flux generated due to an eddy current flowing through the stator core 10 varies with location in the stator core 10. Due to the skin effect, the magnetic flux concentrates at the surface of the stator core 10. Thus, the magnetic flux density is high at the surface of the stator core 10, and decreases with distance from the surface. The depth of the high magnetic flux density region that extends from the surface of the stator core 10 is denoted by the skin depth $\delta$. The skin depth $\delta$ is obtained by Equation 1.

$$\delta = \sqrt{\frac{2}{\omega\sigma\mu}}$$ [Equation 1]

In Equation 1, σ represents the conductivity (S/m) of the stator core 10, which is a magnetic body; μ represents the magnetic permeability (H/m) of the stator core 10; and ω represents the angular velocity (rad/s). The magnetic permeability μ and the angular velocity ω are obtained by Equations 2 and 3, respectively.

$$\mu = \mu_0 \times \mu_r$$ [Equation 2]

$$\mu = 2\pi f$$ [Equation 3]

In Equation 2, $\mu_0$ represents the magnetic permeability ($4\pi \times 10^{-7}$H/m) in vacuum, and $\mu_r$ represents the relative permeability of the stator core 10. In Equation 3, f represents the electric frequency (Hz) when the magnetic resolver 1 is used.

When the electric frequency f is a value in a high frequency region, for example, a value of approximately 10 kHz, the magnetic flux density is high at the surface of the stator core 10 due to the skin effect. Thus, the magnetic flux flows only in the skin portion of the stator core 10. If the thickness of the stator core 10 is less than the skin depth δ that is obtained by Equation 1 and corresponds to the thickness of the layer in which the magnetic flux flows due to the skin effect, the magnetic flux flowing from the stator core 10 to the rotor 50 becomes saturated. That is, if the thickness of the stator core 10 is not sufficient, the flow of the magnetic flux is hindered and the magnetic flux output to the rotor 50 decreases. Accordingly, the magnetic flux that passes through the through-hole 18 but does not come out of the stator core 10 increases. As a result, loss of the magnetic flux increases and the transformer ratio decreases.

In order to reduce such magnetic flux loss, the thickness t (burring thickness) of the side wall 14 shown in FIG. 6 need to be larger than the skin depth δ of the stator core 10 obtained by Equation 1. By securing a burring thickness larger than the skin depth δ, it is possible to allow a sufficient amount of magnetic flux to flow from the stator core 10 to the rotor 50. Consequently, it is possible to suppress a decrease in magnetic flux flowing to the rotor 50 due to the skin effect, to reduce leakage flux, and to increase the transformer ratio.

Figure 7:
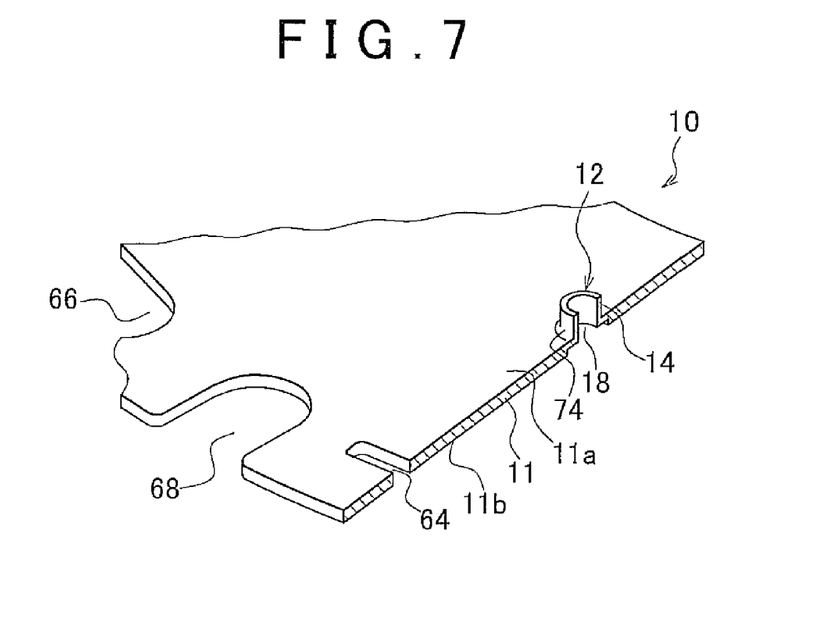
FIG. 7 is a cross-sectional view showing a stator core according to a second embodiment of the invention.
Figure 8:
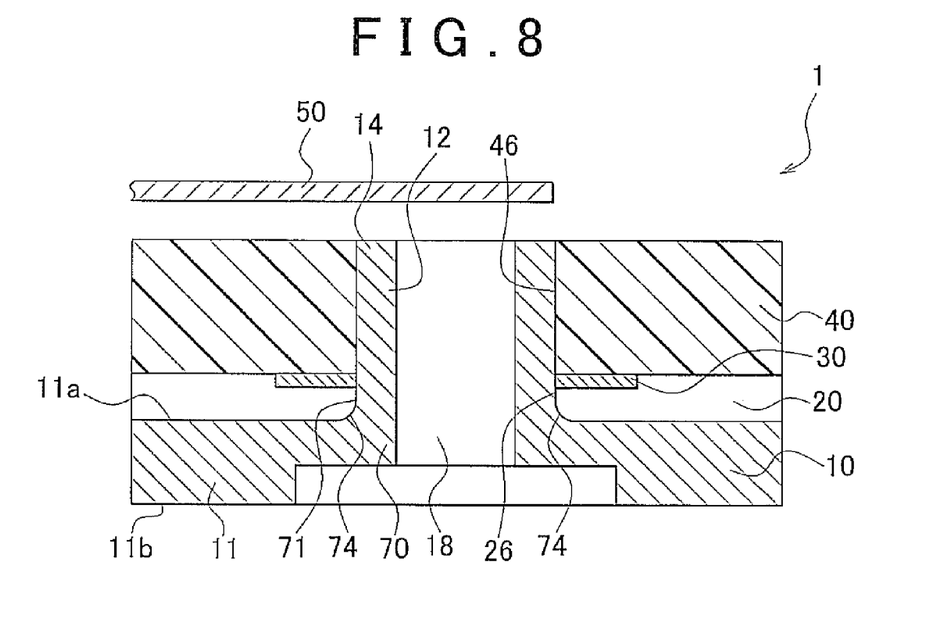
FIG. 8 is a cross-sectional view showing a magnetic resolver according to the second embodiment.

FIG. 7 is a cross-sectional view showing a stator core 10 according to a second embodiment of the invention. FIG. 8 is a cross-sectional view showing a magnetic resolver 1 according to the second embodiment. The magnetic resolver 1 of the second embodiment is different from the magnetic resolver 1 of the first embodiment, in the shape of the protrusions 12 formed on the stator core 10. Specifically, as shown in FIGS. 7 and 8, in each protrusion 12, the outer peripheral face 71 of the side wall 14 at a base portion 70 is formed in a curved shape, such as an arc, in a longitudinal cross section of the protrusion 12, so that the outer diameter of the base portion 70 is larger than that of the other portion of the protrusion 12. Thus, the base portion 70 of the protrusion 12 has an extension portion 74, at which the outer peripheral face 71 of the side wall 14 has a curved shape in the longitudinal cross section of the protrusion 12.

In the magnetic resolver 1 according to the first embodiment shown in FIG. 6, the side wall 14 has a cylindrical shape, and the outer peripheral face 71 of the side wall 14 has a linear shape in the longitudinal cross section of the protrusion 12. Therefore, at the base portion 70 of the side wall 14, a corner 72 is formed on the boundary between the base plate 11 and the side wall 14. At the corner 72, magnetic strain is generated due to a stress applied during processing. Therefore, the magnetic flux concentrates at the corner 72, and the magnetic resistance increases.

In contrast, when the base portion 70 of the protrusion 12 is formed in such a manner that the outer peripheral face 71 has a curved shape in the longitudinal cross section of the protrusion 12 as in the magnetic resolver 1 according to the second embodiment, the stress applied during processing is reduced and therefore the magnetic strain is also reduced. In addition, because the cross-sectional area of the side wall 14 is larger than that of the magnetic resolver 1 according to the first embodiment, the magnetic resistance to the magnetic flux passing through the stator core 10 decreases, which facilitates the passage of the magnetic flux through the stator core 10. Thus, unlike the magnetic resolver 1 according to the first embodiment where the magnetic flux concentrates at the corner 72, the magnetic flux is dispersed. As a result, the magnetic flux output to the rotor 50 is increased. Consequently, the transformer ratio is increased.

The shape of the outer peripheral face 71 of the base portion 70 of the protrusion 12 in the longitudinal cross section of the protrusion 12 is not limited to an arc shape. The shape of the outer peripheral face 71 in the longitudinal cross section of the protrusion 12 may be any curved shape without an inflection point, for example, an elliptic arc or parabolic shape.

The embodiments of the invention have been described above. However, it should be noted that the above embodiments are merely examples and the invention is not limited to the above embodiments. The scope of the invention is specified not by the above description but by the claims, and is intended to include various modifications that are equivalent to or within the scope of claims.

The magnetic resolver according to the invention may be suitably used as, for example, a rotation sensor that detects the position of a rotor of a rotary electric machine.

What is claimed is:

1. A magnetic resolver, comprising:
   a stator core that is made of magnetic material and that has a base plate and a plurality of protrusions formed integrally with the base plate so as to protrude from a surface of the base plate in a thickness direction of the base plate;
   a plurality of coils provided around the respective protrusions; and
   a rotor that is disposed so as to face the surface of the base plate with the coils interposed between the rotor and the surface of the base plate, wherein
   an overlapping area between the rotor and each of the protrusions changes with a change in a rotation angle of the rotor relative to the stator core, and
   the stator core has a plurality of through-holes that pass through the base plate and the respective protrusions in the thickness direction.

2. The magnetic resolver according to claim 1, wherein a base portion of each of the protrusions has an extension portion of which an outer peripheral face has a curved shape in a longitudinal cross section of the protrusion.

3. The magnetic resolver according to claim 2, wherein an outer diameter of the extension portion increases toward the base plate.

4. The magnetic resolver according to claim 1, wherein a thickness of the protrusions is larger than a skin depth that is a thickness of a layer which is formed in a surface portion of the stator core and in which magnetic flux flows due to a skin effect that occurs when the magnetic resolver is used at an electric frequency within a predetermined range of high electric frequencies.

* * * * *